United States Patent
Hayashi et al.

(10) Patent No.: US 10,666,721 B2
(45) Date of Patent: May 26, 2020

(54) RESOURCE MANAGEMENT DEVICE AND METHOD

(71) Applicant: FUJITSU LIMITED, Kawasaki-shi, Kanagawa (JP)

(72) Inventors: Miki Hayashi, Yokohama (JP); Daisuke Kudo, Koshigaya (JP); Chan Jeon Jeon, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 15/789,665

(22) Filed: Oct. 20, 2017

(65) Prior Publication Data

US 2018/0124170 A1 May 3, 2018

(30) Foreign Application Priority Data

Oct. 28, 2016 (JP) ................................ 2016-211726

(51) Int. Cl.
| | |
|---|---|
| *G06F 15/16* | (2006.01) |
| *H04L 29/08* | (2006.01) |
| *G06F 9/50* | (2006.01) |
| *G06F 9/455* | (2018.01) |
| *H04L 12/927* | (2013.01) |

(52) U.S. Cl.
CPC ...... *H04L 67/1031* (2013.01); *G06F 9/45558* (2013.01); *G06F 9/5072* (2013.01); *G06F 9/5077* (2013.01); *H04L 47/803* (2013.01); *G06F 2009/45595* (2013.01); *H04L 67/025* (2013.01); *H04L 67/32* (2013.01)

(58) Field of Classification Search
CPC ... H04L 67/1031; H04L 67/025; H04L 67/32; H04L 47/803; G06F 9/45558; G06F 9/5072; G06F 9/5077; G06F 2009/45595
USPC ........................................................ 709/206
See application file for complete search history.

(56) References Cited

U.S. PATENT DOCUMENTS

| | | | | |
|---|---|---|---|---|
| 2007/0234302 A1* | 10/2007 | Suzuki | ...................... | G06F 8/61 |
| | | | | 717/126 |
| 2014/0089920 A1 | 3/2014 | Yamamoto | | |
| 2015/0227598 A1* | 8/2015 | Hahn | .................... | G06F 16/122 |
| | | | | 707/722 |
| 2015/0277956 A1 | 10/2015 | Uchikawa et al. | | |

(Continued)

FOREIGN PATENT DOCUMENTS

| | | |
|---|---|---|
| JP | 2002-163241 | 6/2002 |
| JP | 2006-285315 | 10/2006 |

(Continued)

*Primary Examiner* — Wing F Chan
*Assistant Examiner* — Joseph R Maniwang
(74) *Attorney, Agent, or Firm* — Fujitsu Patent Center (57) ABSTRACT

A resource management device includes a memory and a processor configured to accept, from the terminal, a request to execute an exclusion of a first processing device from a device group, the device group including processing devices that execute processing in response to an instruction, execute copying of a processing execution history from a storage in the first processing device to a second processing device different from the first processing device among the device group in response to the request, and execute the exclusion of the first processing device from the device group after completion of the copying of the processing execution history.

13 Claims, 10 Drawing Sheets

(56) References Cited

U.S. PATENT DOCUMENTS

2017/0192809 A1* 7/2017 Kaufer ................ G06F 9/45558
2018/0018193 A1* 1/2018 Yabushita ............... G06F 11/20

FOREIGN PATENT DOCUMENTS

JP   2015-194958   11/2015
WO  2013/076913    5/2013

* cited by examiner

SETTING OF CHANGE IN THE NUMBER OF SERVERS (210)

PLEASE SELECT THE NUMBER OF SERVERS AFTER SCALING.
  THE PRESENT NUMBER OF SERVERS : 3
THE NUMBER OF SERVERS AFTER CHANGE [ 2 ▼ ] (211)

(212) [ OK ] [ Cancel ]

⬇

CONFIRMATION OF CHANGE IN THE NUMBER OF SERVERS (210)

THE NUMBER OF SERVERS WILL BE CHANGED. IS THIS OK?
  THE PRESENT NUMBER OF SERVERS : 3
THE NUMBER OF SERVERS AFTER CHANGE : 2

(212) [ OK ] [ Cancel ]

⬇

RESULT OF CHANGE IN THE NUMBER OF SERVERS (210)

CHANGE IN THE NUMBER OF SERVERS HAS BEEN ACCEPTED.

| ID | TYPE | START | UPDATE | STATUS | CLASSIFICATION |
|---|---|---|---|---|---|
| SCM001 | WEB | 06-22 9:00 | 06-22 9:05 | EXECUTION HAS BEEN COMPLETED | IN |
| SCM001 | AP | 06-22 9:00 | null | IN EXECUTION | OUT |
| SCM002 | WEB | 05-30 12:10 | 05-30 12:15 | EXECUTION HAS FAILED | OUT |
| SCM002 | AP | 05-30 12:30 | null | IN EXECUTION | IN |

MESSAGE AREA

WEB/AP PAST LOG (?)

NARROWING-DOWN OF PERIOD  2016/04/15 📅 ~ 2016/04/22 📅  [NARROWING-DOWN]

| LOG CLASSIFICATION | FILE NAME | DATE | FILE SIZE (MB) | ACTION |
|---|---|---|---|---|
| OPERATION LOG | apllogs_20160422_105236.zip | 2016/04/22 06:08:23 | 2.0 | [DOWNLOAD] |
| SYSTEM LOG | syslogs_20160422_105236.zip | 2016/04/22 06:08:11 | 1.5 | [DOWNLOAD] |
| OPERATION LOG IN SCALE-IN | ap_9999_web_xxx_scale-in_apllog.zip | 2016/04/21 10:52:43 | 1.0 | [DOWNLOAD] |
| SCALE-IN SYSTEM LOG | ap_9999_web_xxx_scale-in_syslogs.zip | 2016/04/21 10:52:43 | 1.4 | [DOWNLOAD] |
| OPERATION LOG | apllogs_20160421_105236.zip | 2016/04/21 06:08:23 | 2.3 | [DOWNLOAD] |
| SYSTEM LOG | syslogs_20160421_105236.zip | 2016/04/21 06:08:11 | 3.4 | [DOWNLOAD] |
| OPERATION LOG | apllogs_20160420_105236.zip | 2016/04/20 06:08:23 | 0.7 | [DOWNLOAD] |
| SYSTEM LOG | syslogs_20160420_105236.zip | 2016/04/20 06:08:11 | 0.3 | [DOWNLOAD] |

FIG. 10

RESOURCE MANAGEMENT DEVICE AND METHOD

CROSS-REFERENCE TO RELATED APPLICATION

This application is based upon and claims the benefit of priority of the prior Japanese Patent Application No. 2016-211726, filed on Oct. 28, 2016, the entire contents of which are incorporated herein by reference.

FIELD

The embodiments discussed herein are related to resource management such as scale-in processing and scale-out processing.

BACKGROUND

There are cloud services that offer computer processing and so forth to clients through a network. In a cloud environment that offers this cloud service, a large number of servers are prepared in a large-scale data center or the like and a system in which virtual machines such as Web servers, a data storage area, and so forth may be utilized through a network is constructed.

The system that offers the cloud service is equipped with a scaling function of carrying out scale-out to add a virtual server to the system or scale-in to delete a virtual server from the system. Regarding scale-in processing in the scaling function, there is the following technique. For example, a new service request to a server scheduled to be removed is rejected or another server is asked to respond to this request, and the system waits for the end of processing in progress in the server scheduled to be removed. Then, the server scheduled to be removed is removed from the server-coupled entity after the processing end is confirmed.

Related technology is disclosed in, for example, Japanese Laid-open Patent Publication No. 2002-163241.

SUMMARY

According to an aspect of the embodiments, a resource management device includes a memory and a processor configured to accept, from the terminal, a request to execute an exclusion of a first processing device from a device group, the device group including processing devices that execute processing in response to an instruction, execute copying of a processing execution history from a storage in the first processing device to a second processing device different from the first processing device among the device group in response to the request, and execute the exclusion of the first processing device from the device group after completion of the copying of the processing execution history.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In conventional technology, the execution history (log) of the server removed in scale-in is not left and thus it is difficult to verify the course of processing until the scale-in and so forth.

A scale-in processing program, a scale-in processing method, and an information processing system according to embodiments will be described below with reference to the drawings. Configurations having the same function in the embodiments are given the same numeral and overlapping description is omitted. It is to be noted that the scale-in processing program, the scale-in processing method, and the information processing system to be described in the following embodiments merely represent one example and are not what limit the embodiments. Furthermore, the following respective embodiments may be combined as appropriate within a range in which contradiction does not occur.

Figure 1:
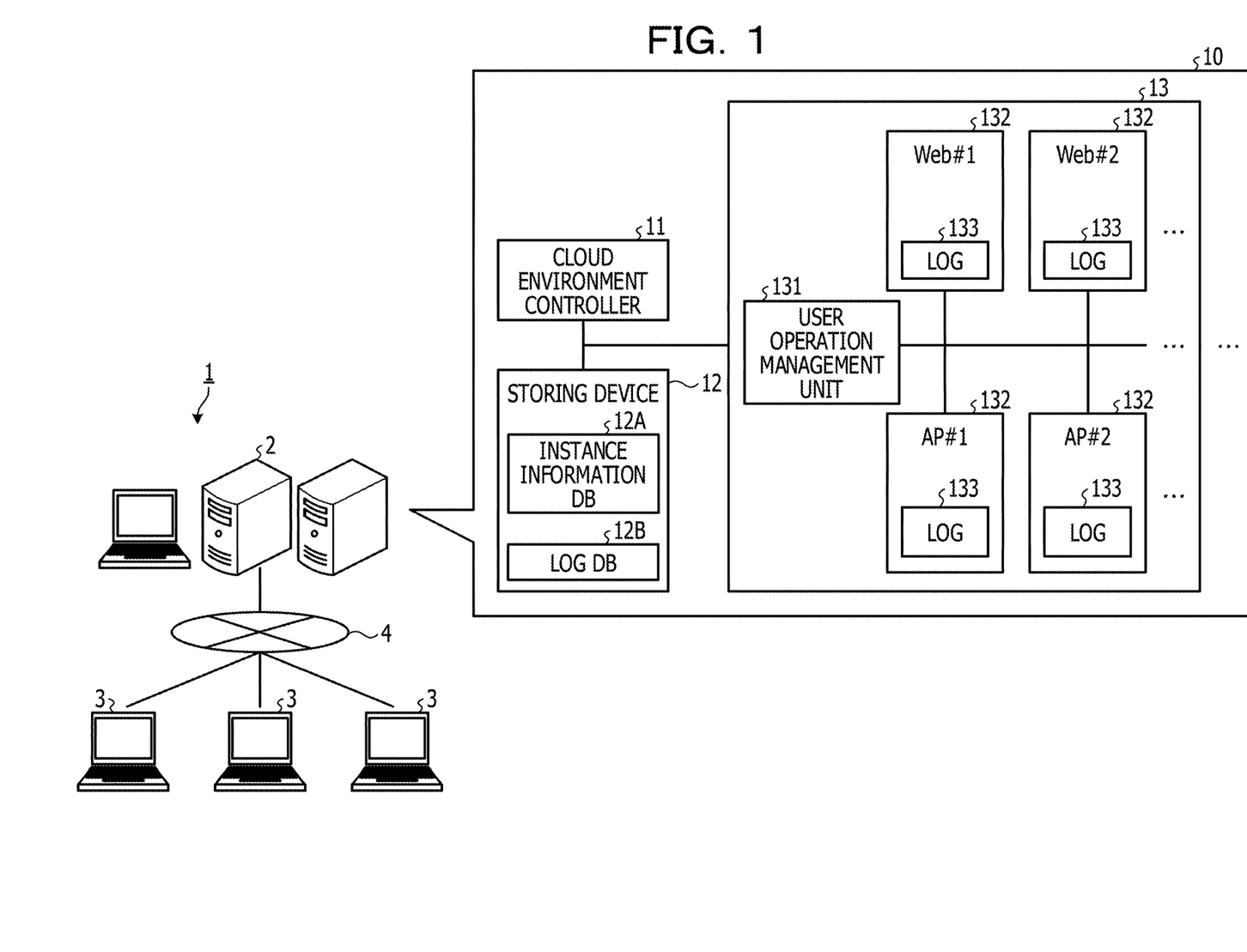
FIG. 1 is a block diagram illustrating a configuration example of an information processing system according to an embodiment.

FIG. 1 is a block diagram illustrating a configuration example of an information processing system according to an embodiment. As illustrated in FIG. 1, an information processing system 1 includes server devices 2 and terminal devices 3 that are coupled communicably through a communication network 4.

The server devices 2 are computers that offer the terminal devices 3 a cloud environment 10 based on cloud services such as infrastructure as a service (IaaS) by a virtualization technique. For example, the server devices 2 are constructed to include at least one physical machine including one or more system boards.

The terminal devices 3 are one or plural information processing terminals used by a user who corresponds to one or plural accounts. As the term "user" here, a user having administrator rights of a virtual machine implemented through virtualization of a server, for example, a business system or the like, in an organization such as a company offered the cloud environment 10 based on IaaS is cited as one example. It is to be noted that, although diagrammatic representation is omitted, suppose that, besides the terminal devices 3 used by the above-described user, terminals of end-users who actually utilize functions provided by the virtual machine are also coupled to the server devices 2.

As one form of the terminal device 3, a personal computer may be employed. It is possible to employ, as the terminal device 3, stationary terminals such as the above-described personal computer and also various kinds of portable terminal devices. As one example of the portable terminal device, mobile communication terminals such as smartphones, mobile phones, and personal handyphone system (PHS), slate terminals such as personal digital assistants (PDA), and so forth are cited.

The server devices 2 and the terminal devices 3 are coupled mutually communicably through the communication network 4. As such a communication network 4, any kind of communication network such as the Internet, a local area network (LAN), or a virtual private network (VPN) may be employed, whether the communication network is a wired network or a wireless network.

The cloud environment 10 is a system environment that is constructed through execution of virtualization software that implements virtualization by the server device 2 and is based on instances (virtual machines (VM)). For example, the cloud environment 10 includes a cloud environment controller 11, a storing device 12, and a user resource 13 for each user corresponding to an account.

The cloud environment controller 11 is one of instances (virtual machines) in the cloud environment 10 and carries out operation management of the cloud environment 10 based on an instruction from the terminal device 3 corresponding to the account of the administrator or the like. For example, the cloud environment controller 11 provides a management screen of the cloud environment 10 to the terminal device 3 corresponding to the account of the administrator or the like based on an instance information database (DB) 12A that manages information on each instance in the cloud environment 10.

Figure 2:
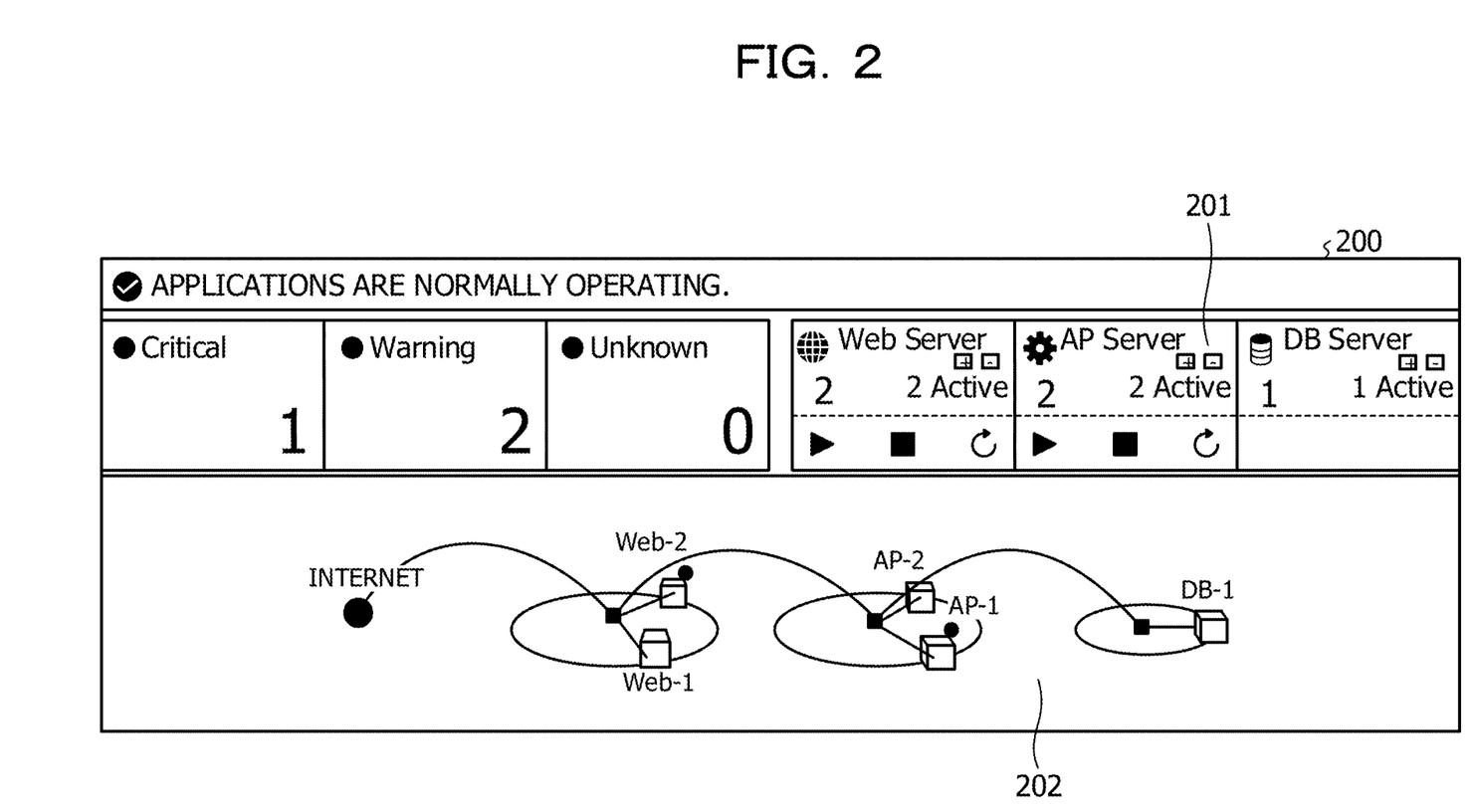
FIG. 2 is an explanatory diagram for explaining a management screen.

FIG. 2 is an explanatory diagram for explaining a management screen. As illustrated in FIG. 2, a management screen 200 is a screen that provides information on virtual servers 132 that are instances in operation in the cloud environment 10 and includes an instance display area 201 and a network display area 202, for example. The instance display area 201 is an area that displays the number of virtual servers 132 in operation (Active) and so forth regarding each of types of a Web server, an application (AP) server, a DB server, and so forth through reference to the instance information DB 12A. The network display area 202 is an area that displays the coupling relationship on a network in the virtual servers 132 in operation through reference to the instance information DB 12A.

The cloud environment controller 11 accepts instructions of various kinds of setting relating to the cloud environment 10 from the terminal device 3 that is displaying the management screen 200, and executes processing for reflecting the contents of the instructions. As one of the setting instructions accepted by the cloud environment controller 11, there is an instruction of scale-in to exclude an instance in the cloud environment 10, for example, the virtual server 132 in operation, from the cloud environment 10. Furthermore, as one of the setting instructions accepted by the cloud environment controller 11, there is an instruction of scale-out to generate an instance and add the instance to the cloud environment 10 as the virtual server 132 in operation. For example, the cloud environment controller 11 accepts an instruction of scale-in/scale-out regarding the virtual server 132 of a given type in the instance display area 201 and thereby provides a setting screen to set the number of increased or decreased instances.

Figure 3:
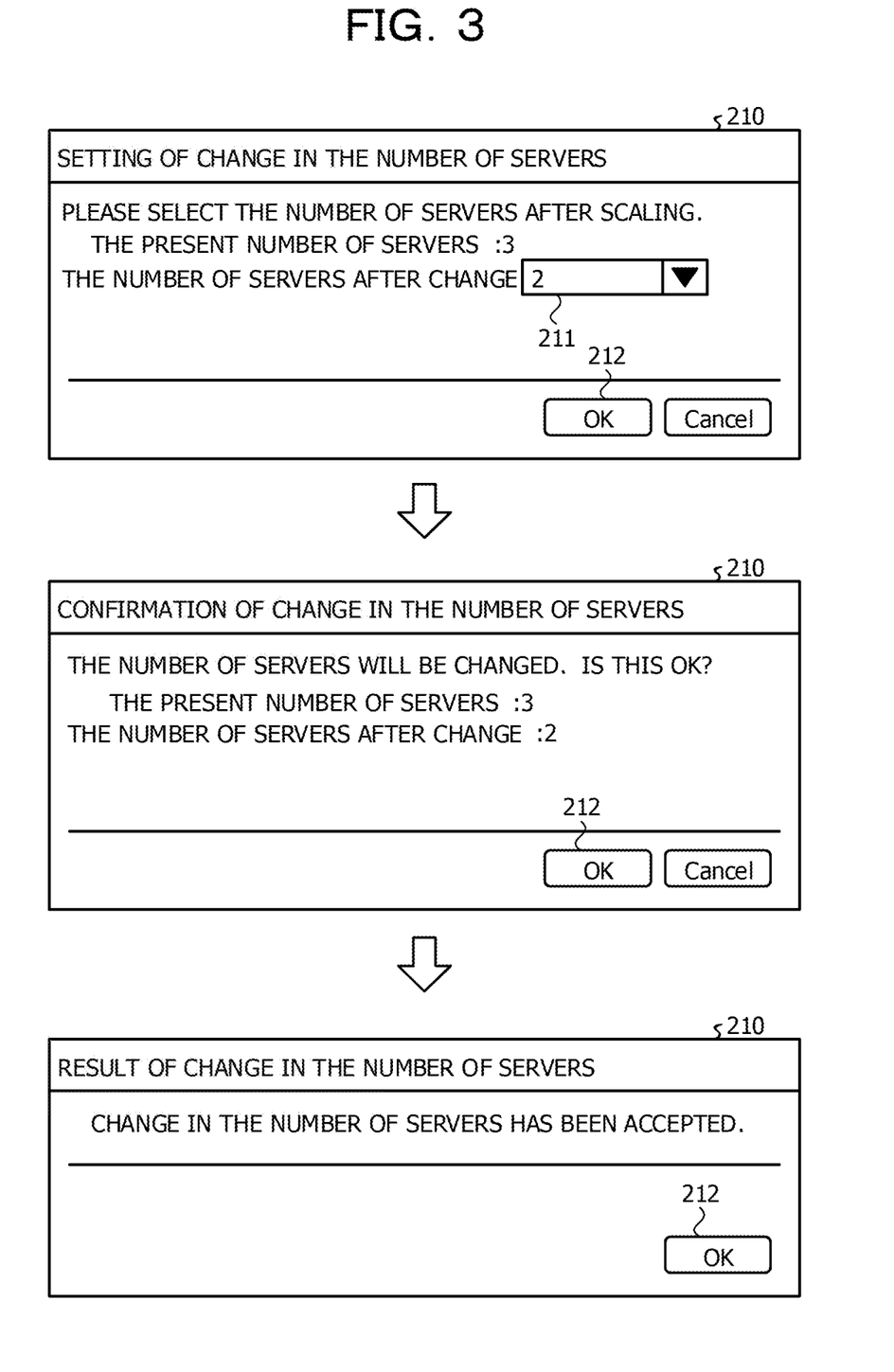
FIG. 3 is an explanatory diagram for explaining a setting screen.

FIG. 3 is an explanatory diagram for explaining a setting screen. As illustrated in FIG. 3, a setting screen 210 includes a setting value input part 211 to which a setting value relating to the number of virtual servers 132 increased or decreased in scale-in/scale-out is input and a setting button 212 to request reflection of the contents of setting.

A user requests scale-in/scale-out by inputting a given setting value from the setting value input part 211 and operating the setting button 212 after confirming the number of increased or decreased virtual servers 132 after the input. The cloud environment controller 11 executes processing of the scale-in/scale-out based on the contents of the requested scale-in/scale-out (details will be described later).

The storing device 12 is a virtual storing device that stores data in the cloud environment 10. As the storing device 12, an object storage that stores data in units of object by using a component such as Swift (registered trademark) may be employed.

The storing device 12 stores the instance information DB 12A and a log DB 12B. The instance information DB 12A is a database that stores various kinds of information of each instance. For example, regarding each instance identification (ID) to identify the instance, the instance information DB 12A stores information on the generation date and time of the instance, the allocation-destination user of the instance, the state of the instance, the contents of the coupling to the network, and so forth. The log DB 12B is a database that stores the log (execution history) of each instance. For example, regarding each instance ID, the log DB 12B stores the execution history of processing in the instance, collected at given timings (for example, every second day) by batch processing or the like.

The user resource 13 is one or plural instances (resources) prepared on the cloud environment 10 for each user corresponding to an account. For example, the user resource 13 includes a user operation management unit 131 and the virtual servers 132.

The user operation management unit 131 is a virtual management server that carries out overall management of the virtual servers 132 in the user resource 13. As one example, the user operation management unit 131 may be a virtual server on which Zabbix (registered trademark), which is software to manage the virtual servers 132 in the user resource 13, or the like is installed.

The virtual servers 132 are virtual servers that may be utilized by users in the cloud environment 10 and there are Web servers, AP servers, DB servers, and so forth, for example. In the diagrammatically-represented example, there are "Web #1,""Web #2," . . . that are Web servers, "AP #1," "AP #2," . . . that are AP servers, and so forth. The virtual server 132 is equipped with a log 133 that is obtained by describing the contents of execution of processing of the virtual server 132 in a virtualized storage area in time-series order and is a system log and operation log or the like.

It is to be noted that, regarding the virtual server 132, the virtual server 132 of an exclusion target to be excluded in scale-in processing (excluded from subjects of processing execution) will be represented as "132A" and the virtual server 132 that is not an exclusion target will be represented as "132B" as a distinction in some cases.

Figure 4:
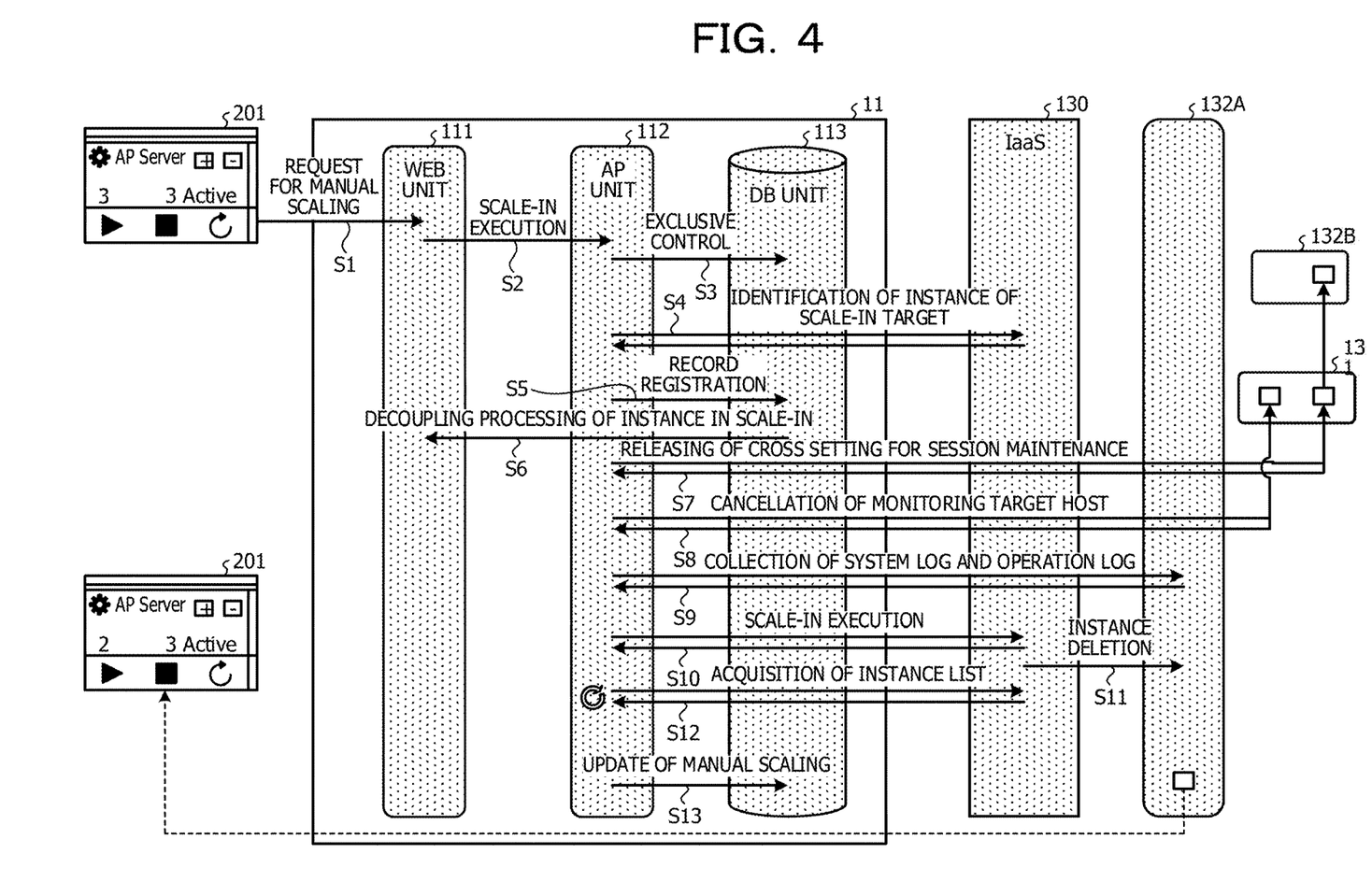
FIG. 4 is an explanatory diagram for explaining scale-in processing of an information processing system according to the embodiment.

Next, details of processing of scale-in/scale-out in the information processing system 1 will be described. FIG. 4 is an explanatory diagram for explaining scale-in processing of an information processing system according to the embodiment. The information processing system illustrated by reference to FIG. 4 may be the information processing system 1 depicted in FIG. 1. As illustrated in FIG. 4, the cloud environment controller 11 includes a WEB unit 111, an AP unit 112, and a DB unit 113 corresponding to three hierarchical layers of a Web system, for example, the respective hierarchical layers of a presentation layer, an application layer, and a data layer.

The WEB unit 111 is a Web server of a portal site constructed as a front-end of an IaaS 130. The WEB unit 111 provides the management screen 200, the setting screen 210, and so forth to the terminal device 3 and accepts a request for scale-in/scale-out from the terminal device 3, for example. For example, the WEB unit 111 is one example of an accepting unit.

The AP unit 112 is an AP server that executes the request accepted from the WEB unit 111. For example, the AP unit 112 executes processing of scale-in/scale-out in response to the request for the scale-in/scale-out. For example, the AP unit 112 is one example of a processing unit.

The DB unit 113 is a DB server that stores various kinds of information. Information is exchanged among the WEB unit 111, the AP unit 112, the DB unit 113, and the IaaS 130 through an application programming interface (API).

In the scale-in processing, first the WEB unit 111 accepts a request for manual scaling (the number of servers decreased in scale-in) (S1). For example, the WEB unit 111 accepts a request to decrease the number of servers to "2" through the setting screen 210 when the number of servers in operation in the instance display area 201 is "3."

Subsequently, the WEB unit 111 notifies the AP unit 112 of an instruction to execute the scale-in as requested through the API (S2). The AP unit 112 that has received the notification carries out exclusive control prior to the execution of the scale-in because the processing is asynchronous processing from the execution of the scale-in until removal of an instance (S3). For example, the AP unit 112 registers the execution of the scale-in in an exclusion table managed by the DB unit 113.

Figure 5:
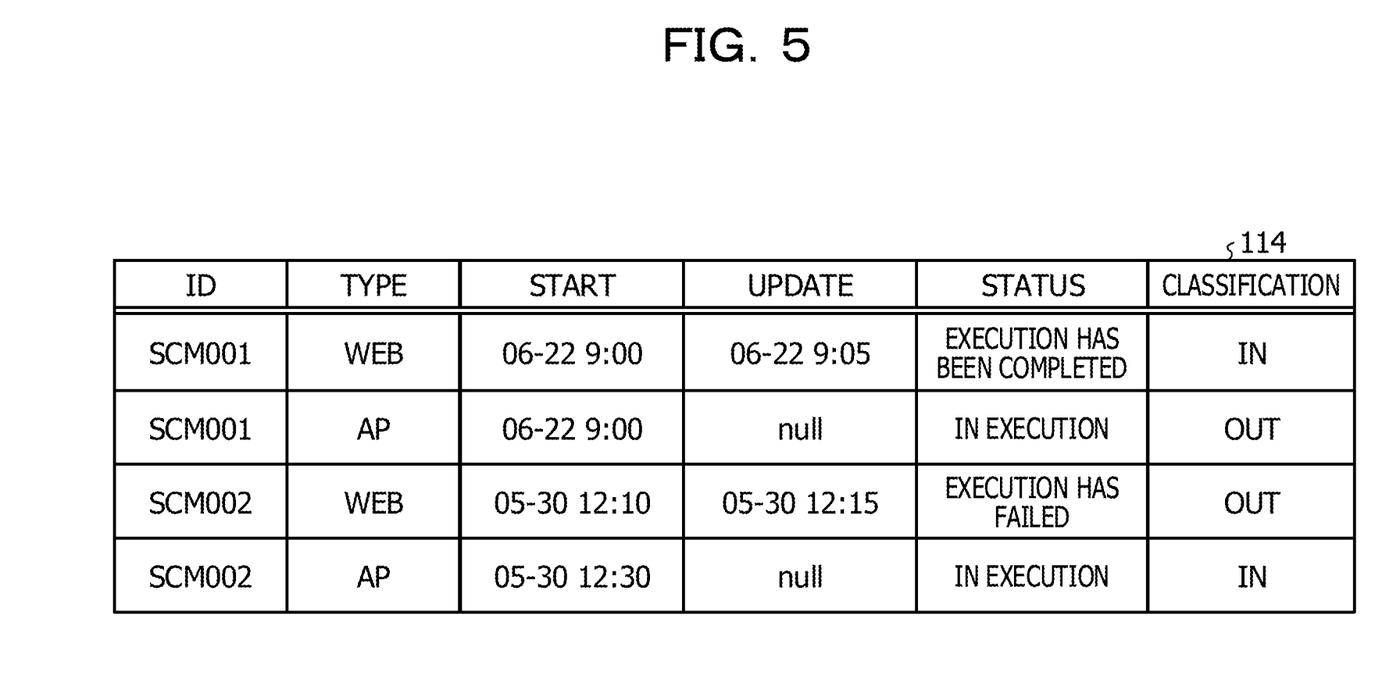
FIG. 5 is an explanatory diagram for explaining an exclusion table.

FIG. 5 is an explanatory diagram for explaining an exclusion table. As illustrated in FIG. 5, an exclusion table 114 has items of "Type," "Start," "Update," "Status," and "Classification" regarding each ID to identify processing relating to exclusion (scale-in/scale-out). "Type" indicates the type of the virtual server 132 of the scale-in/scale-out. "Start" indicates the start clock time of the scale-in/scale-out (clock time of registration in the exclusion table 114). "Update" indicates the clock time when the scale-in/scale-out is executed and update is carried out. It is to be noted that the null value is set before the update. "Status" indicates the state of the scale-in/scale-out (in execution, execution has been completed, execution has failed, or the like). "Classification" indicates which of "In" in the case of scale-in and "Out" in the case of scale-out the processing is.

For example, in the case of executing scale-in of an AP server, in S3, a record in which "Type" is set to "AP" and "Start" is set to the clock time of registration and "Update" is set to the null value and "Classification" is set to "In" is registered in the exclusion table 114.

Subsequently, the AP unit 112 identifies the instance (virtual server 132) of the scale-in target (removal target) from the IaaS 130 (S4). For example, the AP unit 112 refers to the instance information DB 12A and identifies the instance whose generation date and time is old as the instance of the removal target from the type regarding which the scale-in is to be carried out (for example, AP server). It is to be noted that the identification of the instance based on the generation date and time is one example and the identification method of the instance is not particularly limited. For example, an instance whose utilization rate is low may be identified as the removal target based on the state of the instance.

Subsequently, the AP unit 112 registers "in execution" as "Status" in a record of the exclusion table 114 in the DB unit 113 (S5). Subsequently, the AP unit 112 executes decoupling processing of the instance in scale-in (S6). For example, the AP unit 112 updates setting of elastic load balancing (ELB) 136 (see FIG. 6) and decouples subsequent access to the instance of the exclusion target.

Subsequently, the AP unit 112 instructs the user operation management unit 131 to release cross setting for session maintenance in the case of decoupling the virtual server 132A of the exclusion target from plural virtual servers 132 coupled to the ELB 136. The user operation management unit 131 that has received the instruction releases the cross setting for session maintenance (S7).

Figure 6:
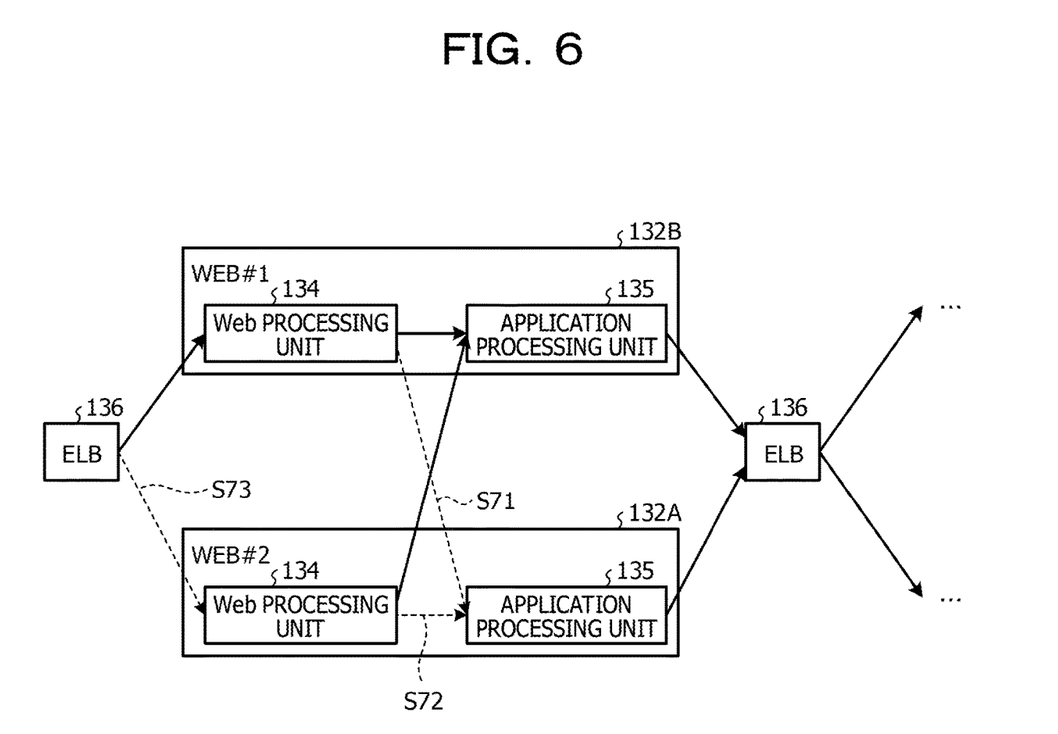
FIG. 6 is an explanatory diagram for explaining releasing of cross setting.

FIG. 6 is an explanatory diagram for explaining releasing of cross setting. As illustrated in FIG. 6, plural virtual servers 132 are coupled to the ELB 136. In the diagrammatically-represented example, "Web #2" is deemed as the virtual server 132A, which is an exclusion target, and "Web #1" is deemed as the virtual server 132B, which is not an exclusion target.

In these virtual servers 132A and 132B, cross setting is carried out in order to maintain the session. For example, based on a setting file such as httpd-proxy.conf in the virtual server 132B, coupling from a Web processing unit 134 of the virtual server 132B to an application processing unit 135 of the virtual server 132A is set. Similarly, based on a setting file such as httpd-proxy.conf in the virtual server 132A, coupling from the Web processing unit 134 of the virtual server 132A to the application processing unit 135 of the virtual server 132B is set.

In S7, the user operation management unit 131 corrects the setting file such as httpd-proxy.conf to release the cross setting for session maintenance.

For example, the user operation management unit 131 decouples the application processing unit 135 of the virtual server 132A of the exclusion target from the Web processing unit 134 of the virtual server 132B, which is not an exclusion target (S71). Subsequently, the user operation management unit 131 decouples the Web processing unit 134 of the virtual server 132A from the application processing unit 135 (S72). Subsequently, the user operation management unit 131 decouples the Web processing unit 134 from the ELB 136 based on a command of the IaaS 130 (S73).

As above, in the information processing system 1, by releasing the cross setting for session maintenance prior to scale-in, communication from the virtual server 132B, which is not an exclusion target, to the virtual server 132A of the exclusion target in the scale-in may inhibited.

Subsequently, the AP unit 112 instructs the user operation management unit 131 to cancel the monitoring target host regarding the virtual server 132A of the exclusion target (S8). Subsequently, the AP unit 112 collects the log 133 that is a system log and operation log or the like from the virtual server 132A of the exclusion target (S9).

Figure 7:
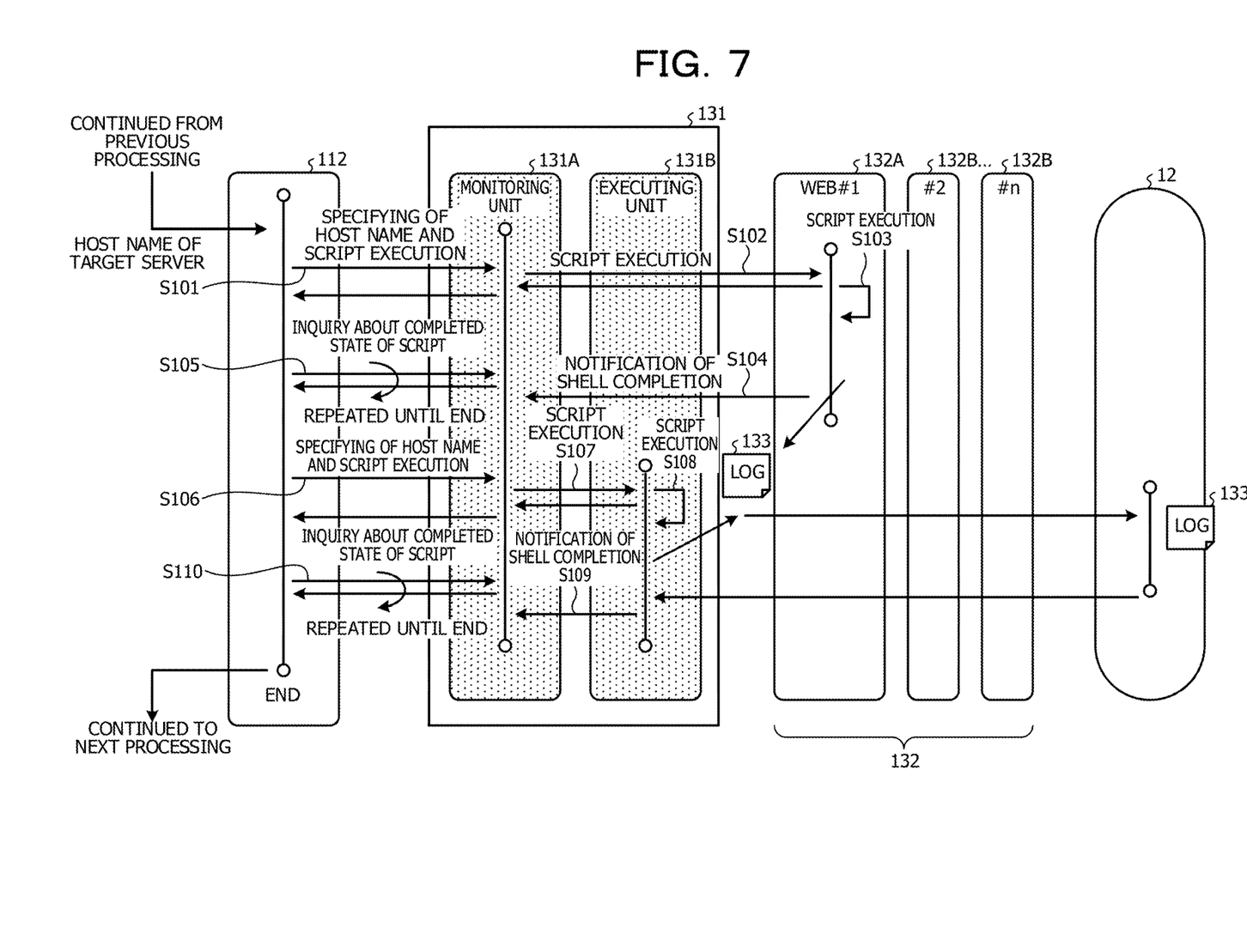
FIG. 7 is an explanatory diagram for explaining collection processing of a log.

FIG. 7 is an explanatory diagram for explaining collection processing of a log. As illustrated in FIG. 7, the user operation management unit 131 includes a monitoring unit 131A that carries out monitoring by Zabbix (registered trademark) and an executing unit 131B such as a shell that actually executes processing.

When the processing of collecting the log 133 is started, the AP unit 112 specifies the host name of the target server that is the virtual server 132A of the exclusion target and requests the monitoring unit 131A to execute a script relating to the collection of the log 133 (S101).

The monitoring unit 131A executes the script relating to the collection of the log 133 of the virtual server 132A with the specified host name (in the diagrammatically-represented example, "WEB #1") through the executing unit 131B (S102). Regarding this script, a script of batch processing of collecting the log 133 at regular intervals may be used.

The virtual server 132A that has received the instruction through the execution of the script copies its own log 133 into a shared area such as the network file system (NFS) by execution of a shell (for example, COPY command) (S103). Subsequently, the virtual server 132A notifies the monitoring unit 131A of the completion of the shell execution (S104). In response to the notification of the completion from the virtual server 132A, the monitoring unit 131A sets the script to the completed state.

The AP unit 112 inquires the completed state of the script requested in S101 of the monitoring unit 131A (S105). This inquiry is repeated at given intervals until the completed state of the script is confirmed.

The AP unit 112 that has confirmed the completed state of the script in S101 specifies the host name of the storing destination of the log 133 (in the present embodiment, the storing device 12) and requests the monitoring unit 131A to execute a script of storing the log 133 (S106).

Subsequently, the monitoring unit 131A executes the script requested in S106 (S107). By the script execution of the monitoring unit 131A, the executing unit 131B executes a shell to store the log 133 copied into the shared area such as the NFS in the storing device 12 as the storing destination (S108). Subsequently, the executing unit 131B notifies the monitoring unit 131A of the completion of the shell execution in S108 (S109). In response to the notification of the completion from the executing unit 131B, the monitoring unit 131A sets the script to the completed state.

The AP unit 112 inquires the completed state of the script requested in S106 of the monitoring unit 131A (S110). This inquiry is repeated at given intervals until the completed state of the script is confirmed. If confirming the completed state of the script, the AP unit 112 ends the processing of collecting the log 133.

Referring back to FIG. 4, the AP unit 112 executes the scale-in of removing the virtual server 132A of the removal target from the IaaS 130 and updating the instance information DB 12A (S10). Thereby, in the IaaS 130, instance deletion is carried out (S11) and the virtual server 132A is removed. Subsequently, the AP unit 112 acquires an instance list from the IaaS 130 and confirms the removal (S12). The AP unit 112 that has confirmed the removal registers "execution has been completed" as "Status" in the exclusion table 114 of the DB unit 113 and updates the manual scaling (S13).

Figure 8:
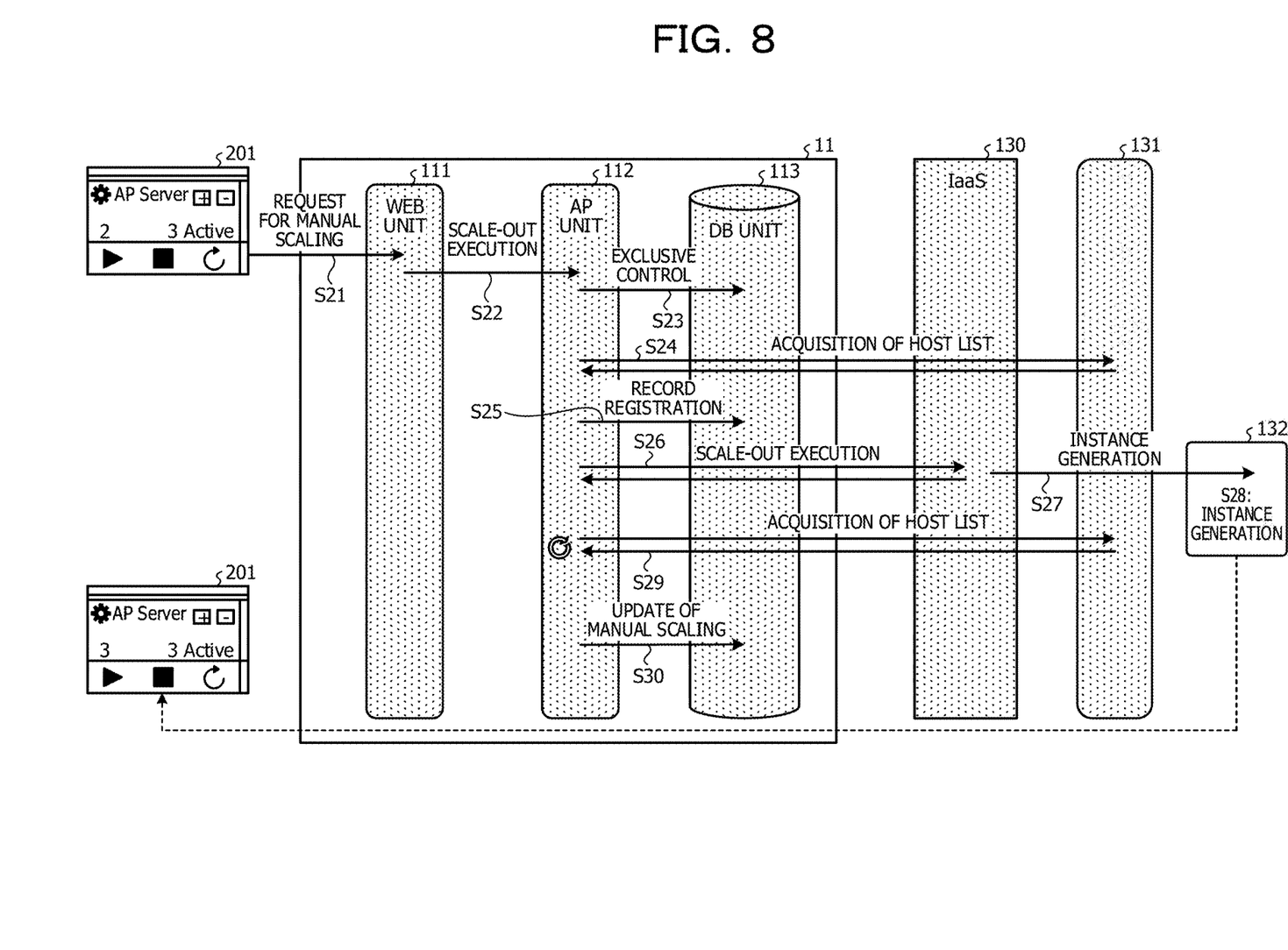
FIG. 8 is an explanatory diagram for explaining scale-out processing of an information processing system according to the embodiment.

FIG. 8 is an explanatory diagram for explaining scale-out processing of an information processing system according to the embodiment. The information processing system illustrated by reference to FIG. 8 may be the information processing system 1 depicted in FIG. 1. As illustrated in FIG. 8, in the scale-out processing, first the WEB unit 111 accepts a request for manual scaling (the number of servers increased in scale-out) (S21). For example, the WEB unit 111 accepts a request to increase the number of servers to "3" through the setting screen 210 when the number of servers in operation in the instance display area 201 is "2."

Subsequently, the WEB unit 111 notifies the AP unit 112 of an instruction to execute the scale-out as requested through the API (S22). The AP unit 112 that has received the notification carries out exclusive control prior to the execution of the scale-out because the processing is asynchronous processing from the execution of the scale-out until generation of an instance (S23). For example, the AP unit 112 registers the execution of the scale-out in the exclusion table 114 managed by the DB unit 113 similarly to scale-in.

Subsequently, the AP unit 112 acquires a host list of hosts that are instances (virtual servers 132) in operation from the user operation management unit 131 through the IaaS 130 (S24). Subsequently, the AP unit 112 registers the hosts of the host list in records of the exclusion table 114 as exclusive control targets (S25).

Subsequently, the AP unit 112 executes the scale-out to generate the new virtual server 132 in the IaaS 130 (S26) and instance generation is carried out in the IaaS 130 (S27 and S28). At this time, processing of resource deployment, patch, and so forth is executed in the new virtual server 132.

Subsequently, the AP unit 112 acquires the host list of instances (virtual servers 132) in operation from the user operation management unit 131 through the IaaS 130 (S29). Thereby, the AP unit 112 confirms the generation of the new instance and updates the instance information DB 12A. Subsequently, the AP unit 112 that has confirmed the generation of the instance registers "execution has been completed" as "Status" in the exclusion table 114 of the DB unit 113 and updates the manual scaling (S30). As above, by executing the scale-out, the new virtual server 132 is registered as the user resource 13 on the cloud environment 10. The execution history (log) of the virtual server 132 registered through the scale-out is collected at given timings (for example, every second day) by batch processing of the cloud environment controller 11 or the like and is stored in the log DB 12B.

As described above, the cloud environment controller 11 copies the log 133 of the virtual server 132A to be removed in scale-in into the log DB 12B of the storing device 12 before the scale-in. For this reason, in the information processing system 1, the log 133 of the virtual server 132A to be removed in the scale-in is not lost due to the scale-in. For example, when providing a list display screen that displays a list of logs stored in the log DB 12B in response to a request from the terminal device 3, the cloud environment controller 11 may present the log 133 collected before removal in scale-in.

Figure 9:
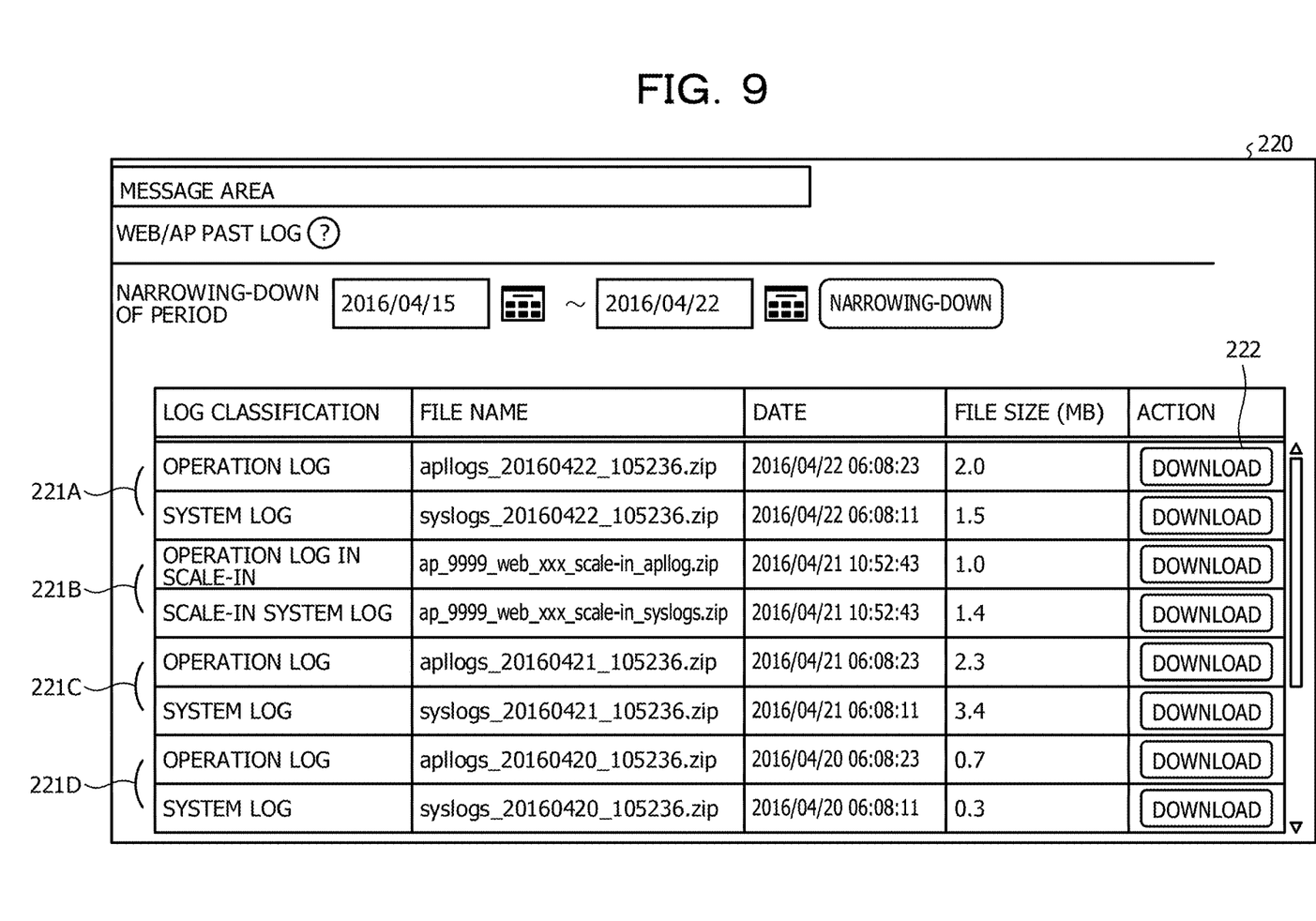
FIG. 9 is an explanatory diagram for explaining a list display screen of logs.

FIG. 9 is an explanatory diagram for explaining the list display screen of logs. As illustrated in FIG. 9, a list display screen 220 is a screen provided through reading of logs 221A to 221D stored in the log DB 12B in response to a request from the terminal device 3. The logs 221A to 221D are the logs 133 collected from the virtual server 132A in batch processing at regular intervals and scale-in processing. As one example, the log 221B is the log 133 collected from the virtual server 132A in scale-in. In this manner, in the list display screen 220, the log 133 of the virtual server 132A removed in scale-in may be checked.

For example, if the log 133 is not copied from the virtual server 132A and not stored in the log DB 12B in scale-in processing, the log 221B between the logs 221A and 221C collected by batch processing at regular intervals, for example, the log in the period until the scale-in, is lost. Furthermore, also in the case in which, after scale-out, scale-in is carried out before collection of the log 133 by batch processing at regular intervals, the log in the period after the scale-out until the scale-in is lost similarly. Regarding such a period in which the log is lost, it is difficult to track failure, the access history, and so forth. However, in the present embodiment, the log 221B collected from the virtual server 132A in scale-in may be checked and therefore failure, the access history, and so forth of the virtual server 132A before the scale-in may be tracked.

Furthermore, in the information processing system 1, processing of collecting the log 133 from the virtual server 132A of the removal target is executed immediately close to execution of the scale-in. Due to this, in the information processing system 1, the contents of execution of the virtual server 132A until the timing immediately close to the scale-in may be checked from the collected log 133. The "immediately close" represents a period equal to or shorter than ten minutes, for example.

Each of the logs 221A to 221D is provided with an instruction button 222 to request download (output). When accepting an operation instruction of the instruction button 222 provided for the logs 221A to 221D, the cloud environment controller 11 outputs the log regarding which the operation instruction is made to the terminal device 3. This allows the user to acquire the desired log by operating the instruction button 222 provided for the logs 221A to 221D.

As described above, in the information processing system 1, in the WEB unit 111 of the cloud environment controller 11, a request for scale-in to exclude at least one virtual server 132 from subjects of processing execution regarding the user resource 13 including plural virtual servers 132 is accepted from the terminal device 3. Furthermore, the AP unit 112 of the cloud environment controller 11 copies the log 133 loaded in the virtual server 132A deemed as the exclusion target due to the scale-in into the log DB 12B of the storing device 12. Subsequently, after the completion of the copying, the AP unit 112 executes the scale-in to exclude the virtual server 132A deemed as the exclusion target from the processing execution subjects.

Therefore, in the information processing system 1, the log 133 of the virtual server 132A to be removed in scale-in is copied into the log DB 12B of the storing device 12 before the scale-in and is not lost due to the scale-in. For this reason, in the information processing system 1, the log 133 of the virtual server 132A removed in scale-in may be checked also after the scale-in by reading out the log DB 12B of the storing device 12.

It is to be noted that the respective constituent elements of the respective devices that are diagrammatically represented may not necessarily need to be configured as diagrammatically represented physically. For example, concrete forms of distribution and integration of the respective devices are not limited to those diagrammatically represented and all or part thereof may be so configured as to be distributed and integrated functionally or physically in arbitrary unit depending on various kinds of loads, the use status, and so forth.

Figure 10:
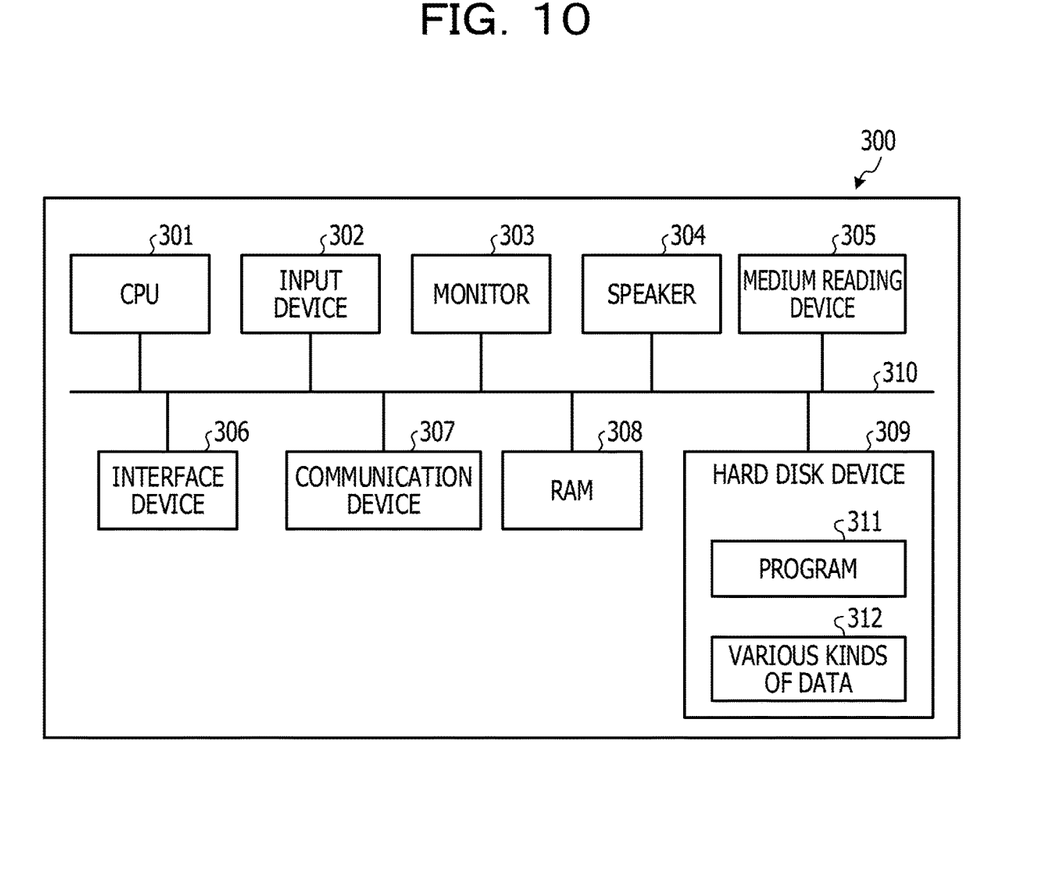
FIG. 10 is a block diagram illustrating one example of a computer that executes a program.

Incidentally, various kinds of processing described in the above-described embodiment may be implemented through execution of a program prepared in advance by a computer. Thus, in the following, one example of a computer that executes a program having functions similar to functions of the above-described embodiment will be described. FIG. 10 is a block diagram illustrating one example of a computer that executes a program.

As illustrated in FIG. 10, a computer 300 includes a central processing unit (CPU) 301 that executes various kinds of arithmetic processing, an input device 302 that accepts data input, a monitor 303, and a speaker 304. Furthermore, the computer 300 includes a medium reading device 305 that reads the program and so forth from a storage medium, an interface device 306 for coupling to various kinds of devices, and a communication device 307 for communication coupling to external equipment in a wired or wireless manner. In addition, the computer 300 includes a random access memory (RAM) 308 that temporarily stores various kinds of information and a hard disk device 309. Moreover, the respective units (301 to 309) in the computer 300 are coupled to a bus 310.

In the hard disk device 309, a program 311 for providing the cloud environment 10 described in the above-described embodiment is stored. Furthermore, various kinds of data 312 to which the program 311 refers are stored in the hard disk device 309. The input device 302 accepts input of operation information from an operator of the computer 300, for example. The monitor 303 displays various kinds of screens operated by the operator, for example. To the interface device 306, for example, a printing device and so forth are coupled. The communication device 307 is coupled to the communication network 4 and exchanges various kinds of information with external equipment through the communication network 4.

The CPU 301 executes various kinds of processing by reading out the program 311 stored in the hard disk device 309 and loading the program 311 in the RAM 308 to execute the program 311. It is to be noted that the program 311 does not have to be stored in the hard disk device 309. For example, the program 311 stored in a storage medium readable by the computer 300 may be read out and executed. The storage medium readable by the computer 300 corresponds to a compact disc read-only memory (CD-ROM), a digital versatile disc (DVD) disk, a portable recording medium such as a universal serial bus (USB) memory, a semiconductor memory such as a flash memory, a hard disk drive, and so forth. Furthermore, the program 311 may be stored in a device coupled to a public line, the Internet, a LAN, or the like and the computer 300 may read out the program 311 therefrom and execute the program 311.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A resource management device comprising:
a memory; and
one or more processors coupled to the memory, the one or more processors configured to:
execute a plurality of virtual machines, the plurality of virtual machines including a first virtual machine and one or more other virtual machines,
wherein the first virtual machine is configured to
accept an exclusion request from a terminal, the exclusion request being a request to execute an exclusion of any of the one or more other virtual machines from the plurality of virtual machines,
execute a first processing in response to the accepting of the exclusion request, the first processing including initiating copying of a processing execution history in the any of the one or more other virtual machines to a shared area in the memory, and
execute a second processing after completion of the copying of the processing execution history, the second processing including performing the exclusion of the any of the one or more other virtual machines, and transmitting the processing execution history stored in the shared area of the memory to a storage device.

2. The resource management device according to claim 1, wherein the first virtual machine is further configured to:
cut off coupling to the any of the one or more other virtual machines from other virtual machines of the one or more other virtual machines before the exclusion.

3. The resource management device according to claim 1, wherein the exclusion is executed immediately after execution of the copying.

4. The resource management device according to claim 1, wherein the first virtual machine is further configured to:
accept, from the terminal, another request to output the processing execution history; and
output the processing execution history to the terminal in response to the accepting of the other request.

5. The resource management device according to claim 1, wherein the exclusion request includes information that designates a number of the any of the one or more other virtual machines which are to be excluded from the one or more other virtual machines.

6. The resource management device according to claim 1, wherein the first virtual machine is further configured to:
accept, from the terminal after the exclusion, another request to execute an addition of another virtual machine to the one or more other virtual machines; and
execute the addition of the another virtual machine to the one or more other virtual machines in response to the accepting of the another request,
wherein the another virtual machine to be added into the one or more other virtual machines does not execute processing according to an instruction from the terminal in a period after the exclusion until the addition.

7. A resource management method executed by a computer, the computer being configured to execute a plurality of virtual machines, the plurality of virtual machines including a first virtual machine and one or more other virtual machines, the method comprising:
causing the first virtual machine to accept an exclusion request from a terminal, the exclusion request being a request to execute an exclusion of any of the one or more other virtual machines from the plurality of virtual machines;
causing the first virtual machine to execute a first processing in response to the accepting of the exclusion request, the first processing including initiating copying of a processing execution history in the any of the one or more other virtual machines to a shared area in the memory; and
causing the first virtual machine to execute a second processing after completion of the copying of the processing execution history, wherein the second processing includes performing the exclusion of the any of the one or more other virtual machines, and transmitting the processing execution history stored in the shared area of the memory to a storage device.

8. The resource management method according to claim 7, the method further comprising:
cutting off coupling to the any of the one or more other virtual machines from other virtual machines of the one or more other virtual machines before the exclusion.

9. The resource management method according to claim 7, wherein the exclusion is executed immediately after execution of the copying.

10. The resource management method according to claim 7, further comprising:
causing the first virtual machine to accept, from the terminal, another request to output the processing execution history; and
causing the first virtual machine to output the processing execution history to the terminal in response to the accepting of the other request.

11. The resource management method according to claim 7, wherein the exclusion request includes information that designates a number of the any of the one or more other virtual machines which are to be excluded from the one or more other virtual machines.

12. The resource management method according to claim 7, further comprising:
causing the first virtual machine to accept, from the terminal after the exclusion, another request to execute an addition of another virtual machine to the one or more other virtual machines; and
causing the first virtual machine to execute the addition of the another virtual machine to the one or more other virtual machines in response to the accepting of the another request,
wherein the another virtual machine to be added into the one or more other virtual machines does not execute processing according to an instruction from the terminal in a period after the exclusion until the addition.

13. A non-transitory computer-readable storage medium storing a program that causes a computer to execute a process, the computer being configured to execute a plurality of virtual machines, the plurality of virtual machines including a first virtual machine and one or more other virtual machines, the process comprising:
causing the first virtual machine to accept an exclusion request from a terminal, the exclusion request being a request to execute an exclusion of any of the one or more other virtual machines from the plurality of virtual machines;
causing the first virtual machine to execute a first processing in response to the accepting of the exclusion request, the first processing including initiating copying of a processing execution history in the any of the one or more other virtual machines to a shared area in the memory; and
causing the first virtual machine to execute a second processing after completion of the copying of the processing execution history, wherein the second processing includes performing the exclusion of the any of the one or more other virtual machines, and transmitting the processing execution history stored in the shared area of the memory to a storage device.

* * * * *